United States Patent
Guo et al.

(10) Patent No.: US 10,474,179 B2
(45) Date of Patent: Nov. 12, 2019

(54) POWER SUPPLY CONTROL DEVICE AND METHOD FOR COMMUNICATION NETWORK

(71) Applicant: ZTE Corporation, Shenzhen, Guangdong (CN)

(72) Inventors: Qiang Guo, Shenzhen (CN); Yuanfeng Wu, Shenzhen (CN); Honglai Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 208 days.

(21) Appl. No.: 15/328,226

(22) PCT Filed: Dec. 1, 2014

(86) PCT No.: PCT/CN2014/092666
§ 371 (c)(1),
(2) Date: Jan. 23, 2017

(87) PCT Pub. No.: WO2015/117476
PCT Pub. Date: Aug. 13, 2015

(65) Prior Publication Data
US 2017/0220085 A1    Aug. 3, 2017

(30) Foreign Application Priority Data
Jul. 24, 2014    (CN) .......................... 2014 1 0355743

(51) Int. Cl.
*G05F 3/08*    (2006.01)
*H02J 3/00*    (2006.01)
(Continued)

(52) U.S. Cl.
CPC ............. *G05F 3/08* (2013.01); *G05B 19/048* (2013.01); *G06F 1/26* (2013.01); *H02J 3/00* (2013.01);
(Continued)

(58) Field of Classification Search
CPC . H02M 3/155–1588; H02M 2001/0022; H02J 3/00; H02J 13/0006; G05F 3/08
See application file for complete search history.

(56) References Cited

U.S. PATENT DOCUMENTS

| 7,002,324 B2 | 2/2006 | Uematsu |
| 7,823,026 B2 * | 10/2010 | Karam ...................... H04L 1/22 |
| | | 714/14 |

(Continued)

FOREIGN PATENT DOCUMENTS

| CN | 1445632 A | 10/2003 |
| CN | 101594236 A | 12/2009 |

(Continued)

OTHER PUBLICATIONS

International Search Report in international application No. PCT/CN2014/092666, dated Apr. 24, 2015, 2 pgs.
(Continued)

*Primary Examiner* — Yusef A Ahmed

(57) ABSTRACT

A power supply control device for a communication network includes: a monitoring module (11) and N voltage-adjustable Direct Current/Direct Current (DC/DC) modules (121, 122 . . . 12N). The monitoring module is configured to detect circuit data of each of power supply circuits (1,2, . . . i), compare the circuit data with each other, calculate an average value, analyze required output circuit data of each of the power supply circuits, and transmit the required output circuit data of the power supply circuits to respective the voltage-adjustable DC/DC modules. The voltage-adjustable DC/DC modules are configured to receive the required output circuit data of the power supply circuits, and adjust output voltages of the power supply circuits according to the output circuit data. Output ends of all of the voltage-adjustable DC/DC modules are connected in parallel to
(Continued)

supply power to a subordinate electro-load. Also disclosed is a power supply control method for the communication network.

3 Claims, 3 Drawing Sheets

(51) Int. Cl.
    *H02J 13/00*                  (2006.01)
    *G05B 19/048*              (2006.01)
    *G06F 1/26*                   (2006.01)

(52) U.S. Cl.
    CPC ............... *H02J 13/0006* (2013.01); *G05B 2219/24015* (2013.01)

(56) References Cited

U.S. PATENT DOCUMENTS

| | | | | |
|---|---|---|---|---|
| 8,581,562 B2* | 11/2013 | Chen | | H02M 3/158 323/222 |
| 8,786,264 B2* | 7/2014 | Muhammad | | H02M 3/1584 323/269 |
| 9,785,127 B2* | 10/2017 | Park | | G05B 15/02 |
| 10,064,254 B1* | 8/2018 | Zhang | | H05B 37/0209 |
| 2003/0048648 A1* | 3/2003 | Lin | | H02M 3/1584 363/65 |
| 2003/0173937 A1 | 9/2003 | Uematsu | | |
| 2003/0185025 A1* | 10/2003 | Takemura | | H02M 3/1584 363/65 |
| 2003/0214354 A1* | 11/2003 | Chen | | H02J 1/102 330/124 D |
| 2004/0169499 A1* | 9/2004 | Huang | | H02J 1/102 323/272 |
| 2004/0217741 A1* | 11/2004 | Muratov | | H02M 3/1584 323/219 |
| 2005/0073783 A1* | 4/2005 | Luo | | H02M 7/493 361/62 |
| 2005/0085212 A1 | 4/2005 | Peker | | |
| 2005/0122140 A1* | 6/2005 | Peker | | H04L 12/10 327/108 |
| 2007/0063681 A1* | 3/2007 | Liu | | H02M 3/1588 323/282 |
| 2007/0170909 A1* | 7/2007 | Vorenkamp | | G06F 1/266 324/76.11 |
| 2007/0278857 A1* | 12/2007 | Robbins | | H02J 1/10 307/2 |
| 2008/0231115 A1* | 9/2008 | Cho | | H02J 1/08 307/41 |
| 2009/0009005 A1* | 1/2009 | Luo | | H02M 7/493 307/82 |
| 2009/0070615 A1* | 3/2009 | Maggiolino | | H04L 12/10 713/340 |
| 2009/0206804 A1* | 8/2009 | Xu | | H02M 3/1584 323/234 |
| 2010/0005322 A1* | 1/2010 | Diab | | H04L 12/40032 713/300 |
| 2010/0046506 A1* | 2/2010 | Feldman | | H04L 12/10 370/352 |
| 2010/0153751 A1* | 6/2010 | Tseng | | H04L 12/40032 713/300 |
| 2012/0091801 A1* | 4/2012 | Koshin | | H02J 1/10 307/24 |
| 2012/0259573 A1 | 10/2012 | Mehnert | | |
| 2012/0262136 A1* | 10/2012 | Nien | | H02M 3/1584 323/272 |
| 2013/0051095 A1* | 2/2013 | Iwata | | H02M 1/4225 363/81 |
| 2013/0076321 A1* | 3/2013 | Saito | | H02M 3/1584 323/271 |
| 2013/0169254 A1* | 7/2013 | Popescu | | H02M 3/1584 323/283 |
| 2013/0193755 A1* | 8/2013 | Chang | | H02J 1/10 307/18 |
| 2014/0372773 A1* | 12/2014 | Heath | | H04L 12/10 713/300 |
| 2015/0076911 A1* | 3/2015 | Pape | | H02J 1/12 307/52 |
| 2015/0188406 A1* | 7/2015 | Nishi | | H02M 3/1584 323/217 |
| 2015/0326403 A1* | 11/2015 | Dwelley | | H04L 12/10 713/300 |
| 2016/0248327 A1* | 8/2016 | Li | | H02M 3/1584 |
| 2016/0301303 A1* | 10/2016 | Bari | | H02M 3/156 |
| 2017/0019026 A1* | 1/2017 | Nien | | H02M 3/1584 |
| 2017/0353321 A1* | 12/2017 | Guo | | H04L 12/10 |
| 2018/0056808 A1* | 3/2018 | Gibson | | H02J 7/0014 |

FOREIGN PATENT DOCUMENTS

| | | |
|---|---|---|
| CN | 101656431 A | 2/2010 |
| CN | 102201699 A | 9/2011 |
| CN | 102355195 A | 2/2012 |
| CN | 101594236 B | 9/2012 |
| CN | 102938699 A | 2/2013 |
| CN | 102959361 A | 3/2013 |
| CN | 103051462 A | 4/2013 |
| CN | 102170358 B | 3/2014 |
| JP | 2000299982 A | 10/2000 |
| WO | 2013086720 A1 | 6/2013 |

OTHER PUBLICATIONS

English Translation of the Written Opinion of the International Search Authority in international application No. PCT/CN2014/092666, dated Apr. 24, 2015, 6 pgs.

Supplementary European Search Report in European application No. 14881798.4, dated Jun. 20, 2017, 7 pgs.

"In the Opposite Direction Data Network with Ethernet Power Supply Technology Energy Saving", Mar. 2012. China Academic Journal Electronic Publishing House, the entire document is in Chinese with the Abstract in English, 5 pgs.

* cited by examiner

POWER SUPPLY CONTROL DEVICE AND METHOD FOR COMMUNICATION NETWORK

TECHNICAL FIELD

The disclosure relates to power supply for communication networks, and more particularly to a power supply control device and method for a communication network.

BACKGROUND

Along with continuous development of a communication network technology, a communication network may be utilized to transmit a current to supply power to electric equipment in the network at the same time when the communication network is utilized to transmit an information flow. For example, Ethernet is utilized to supply power to electronic equipment such as an Internet telephone, a wireless access point, a monitoring camera and terminal switching equipment in the network. For another example, a telephone network is utilized to supply power to electronic equipment such as a telephone set, a nightlight and environment monitoring equipment in the telephone network. Utilizing a communication network to supply power to equipment solves the problem of difficulties in electricity taking, improves flexibility in use of the equipment and reduces mounting complexity and using cost of the equipment. Power on or power off of equipment may also be remotely controlled via the communication network.

Along with wide application of a communication-network-based power supply technology, an electro-load in a communication network has an electricity demand of higher power. In order to implement higher-power communication-network-based power supply, two or more than two pieces of Power Sourcing Equipment (PSE) may usually be adopted to supply power to the same electro-load. When an interface controller receives power supplied by the PSE, currents in two or more than two power supply lines are made to be the same through a current equalization module at first, and then are output to the electro-load through a Direct Current/Direct Current (DC/DC) voltage converter. Different power supply distances of the PSE and different loss in the power supply lines cause great voltage differences between ports of the interface controller. In an existing solution, non-DC/DC conversion is performed on voltage of each of input ports to compensate the voltage differences between input ports to implement current equalization. However, a voltage compensation range brought by such a method is limited, so that a current equalization effect is poor. Moreover, the voltage differences between the input ports are greater, the loss is higher, and thus the efficiency is lower.

SUMMARY

In order to solve the existing technical problems, the embodiments of the disclosure mainly provide a power supply device and method for a communication network.

The technical solutions of the embodiments of the disclosure are implemented as follows.

The embodiments of the disclosure provide a power supply control device for a communication network, including: a monitoring module and N voltage-adjustable DC/DC modules, wherein the monitoring module is configured to detect circuit data of each power supply circuits, compare the circuit data of the power supply circuits with each other, calculate an average value, analyse required output circuit data of each of the power supply circuits, and transmit the required output circuit data of each of the power supply circuits to respective voltage-adjustable DC/DC module;

the voltage-adjustable DC/DC modules are configured to receive the required output circuit data of the circuits from the monitoring module, and adjust output voltages of the circuits according to the output circuit data;

N input ends of the monitoring module are connected with N power supply circuits respectively, and N output ends of the monitoring module are connected with input ends of the N voltage-adjustable DC/DC modules respectively; and output ends of the N voltage-adjustable DC/DC modules may be connected in parallel to supply power to a subordinate electro-load, wherein N is an integer more than or equal to 2.

In the above solution, the monitoring module may include:

a detection unit, configured to detect the circuit data of each of the power supply circuits; and a processing unit, configured to compare the circuit data of the circuits with each other, calculate the average value, analyse the required output circuit data of each of the circuits, and transmit the required output circuit data of each of the circuits to respective voltage-adjustable DC/DC module.

In the above solution, each of the voltage-adjustable DC/DC modules may include: an output voltage feedback network control unit and a DC/DC conversion unit, wherein the output voltage feedback network control unit may be configured to receive the required output circuit data of a corresponding circuit, control turning-on/turning-off of the DC/DC conversion unit, and/or adjust an output voltage of the DC/DC conversion unit; and the DC/DC conversion unit may be configured to implement conversion from a DC input voltage to a DC output voltage in the circuit to adjust the output voltage according to the output circuit data.

In the above solution, the device may further include: N interface controllers, wherein each of the interface controllers may be configured to receive a DC current from a piece of Power Sourcing Equipment (PSE); and an input end of each of the interface controllers may be connected with the PSE, and an output end of each of the interface controllers may be connected with an input end of the monitoring module.

In the above solution, the device may further include: N interface controllers, wherein each of the interface controllers may be configured to receive a DC current from a piece of PSE; and an input end of each of the interface controllers may be connected with the PSE, and an output end of each of the interface controllers may be connected with an input end of the detection unit.

The embodiments of the disclosure also provide a power supply control method for a communication network, including that:

circuit data of each of power supply circuits is detected, the circuit data of the circuits is compared with each other, an average value is calculated, and required output circuit data of each circuit is analysed;

output voltage of each circuit are correspondingly adjusted according to the required output circuit data of each circuit; and the output voltages of all the circuits are connected in parallel to supply power to a subordinate electro-load.

In the above solution, after the step that the circuit data of each circuit is compared with each other, the average value is calculated and the required output circuit data of each circuit is analysed, the method may further include that: enabling/disabling of a DC/DC conversion function is controlled.

In the above solution, before the step that the circuit data of each of the power supply circuits is detected, the method may further include that: DC currents from N pieces of PSE are received, N being an integer more than or equal to 2.

According to the power supply control device and method for the communication network provided by the embodiments of the disclosure, the monitoring module detects and compares the circuit data of the power supply circuits, calculates the average value and analyses the required output circuit data of each of the circuits, and each voltage-adjustable DC/DC module is utilized to automatically adjust the output voltage according to the received data, to implement equalization processing of input currents. In such a manner, a voltage compensation range may be effectively widened, conversion efficiency of current equalization may be improved, and system heat loss may be reduced, so that more electric energy may be provided, and adaptability to wider application scenarios may be achieved.

DETAILED DESCRIPTION

In order to describe embodiments and technical solutions of the disclosure more clearly, the technical solutions of the disclosure will be described below with reference to the drawings and the embodiments in more details. Obviously, the described embodiments are not all embodiments but a part of the embodiments of the disclosure. All other embodiments obtained by those skilled in the art on the basis of the embodiments of the disclosure without creative work fall within the scope of protection of the disclosure.

In the embodiment of the disclosure, Power Sourcing Equipment (PSE) refers to a source which provides electric energy, and an electro-load refers to a load which is finally required to use the electric energy. During communication-network-based power supply, an interface controller is usually required to be arranged between PSE and an electro-load, and the interface controller controls whether to receive a current from the PSE or not, and transmits the current to the subordinate electro-load. A communication network may be a power supply network which may provide a DC current, such as the Ethernet and a telephone network. The PSE, the interface controller and another load(s) in a circuit therebetween are collectively referred to as a power supply circuit.

The power supply control device and the method for a communication network provided by the embodiments of the disclosure are applicable to a condition that N power supply circuits supply power to the same electro-load, wherein N is an integer more than or equal to 2. The power supply control device for the communication network in the embodiment of the disclosure may be independent equipment, may also be integrated into the same equipment together with a superior interface controller or integrated into the same equipment together with a subordinate electro-load, and may also be integrated into the same equipment together with the superior interface controller and the subordinate electro-load.

Figure 1:
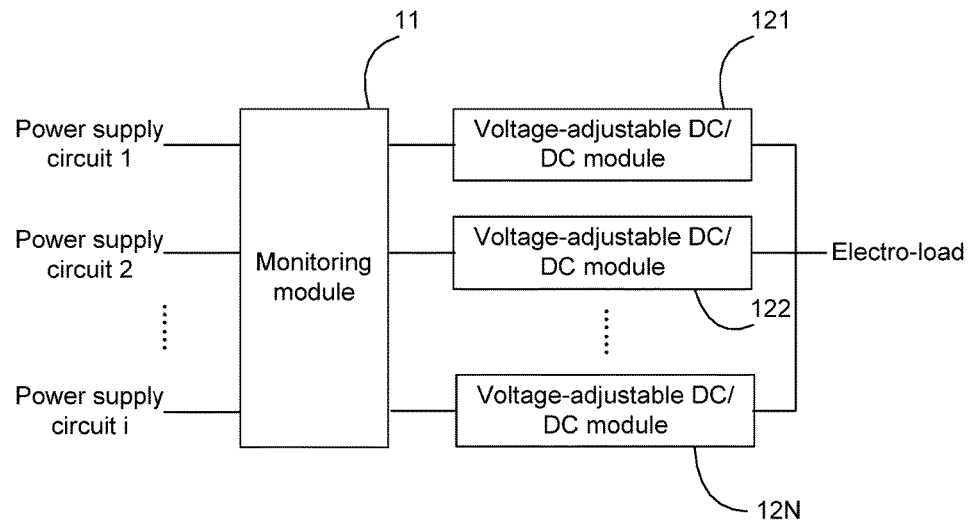
FIG. 1 is a structure diagram illustrating an embodiment of a power supply control device for a communication network according to the disclosure.

FIG. 1 is a structure diagram illustrating an embodiment of a power supply control device for a communication network according to the disclosure. As shown in FIG. 1, the device includes: a monitoring module 11 and N voltage-adjustable DC/DC modules 12$i$, i=1,2, . . . N.

The monitoring module 11 is configured to detect circuit data of each of power supply circuits, compare the circuit data of the circuits, calculate an average value, analyse required output circuit data of each circuit, and transmit the required output circuit data of each circuit to respective voltage-adjustable DC/DC module 12$i$; and the voltage-adjustable DC/DC modules 12$i$ are configured to receive the required output circuit data of the circuits, and adjust output voltages.

Here, N input ends of the monitoring module 11 are connected with N power supply circuits respectively, and N output ends of the monitoring module 11 are connected with input ends of the N voltage-adjustable DC/DC modules 12$i$ respectively; and output ends of the N voltage-adjustable DC/DC modules 12$i$ are connected in parallel to supply power to a subordinate electro-load.

Specifically, the monitoring module 11 is arranged behind each of the power supply circuits, namely behind each of the interface controllers, and detects the circuit data of each of the power supply circuits. The circuit data refers to circuit data which includes current data and/or voltage data and may be detectable. The monitoring module 11 compares the detected circuit data of the circuits, calculates the average value, analyses required output voltage of each circuit, and sends the required output circuit data of the circuits to voltage-adjustable DC/DC modules 12$i$, respectively, so that each of the voltage-adjustable DC/DC modules 12$i$ adjusts the output voltage of each circuit. The circuits of which the output voltages are adjusted are connected in parallel to supply power to the subordinate electro-load.

Here, the monitoring module 11 may be located in the power supply circuits, and may also be located outside the power supply circuits. The monitoring module 11 sends control information to each of the voltage-adjustable DC/DC modules 12$i$.

Figure 2:
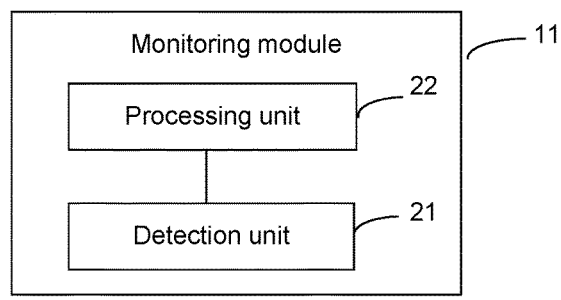
FIG. 2 is a structure diagram illustrating an embodiment of a monitoring module in a power supply control device for a communication network according to the disclosure.

In an embodiment, as shown in FIG. 2, in the power supply control device for the communication network, the monitoring module 11 includes a detection unit 21 and a processing unit 22.

The detection unit 21 is configured to detect the circuit data of each of the power supply circuits.

The processing unit 22 is configured to compare the circuit data of each circuit with each other, calculate the average value, analyse the required output circuit data of each circuit, and transmit the required output circuit data of each circuit to respective voltage-adjustable DC/DC module.

Figure 3:
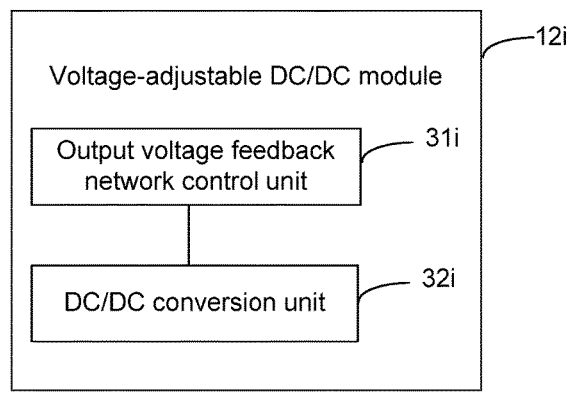
FIG. 3 is a structure diagram illustrating an embodiment of a voltage-adjustable DC/DC module in a power supply control device for a communication network according to the disclosure.

In an embodiment, as shown in FIG. 3, in the power supply control device for the communication network, each of the voltage-adjustable DC/DC modules 12$i$ (wherein i=1,2, . . . N, and N is an integer more than or equal to 2) includes: an output voltage feedback network control unit 31$i$ and a DC/DC conversion unit 32$i$.

The output voltage feedback network control unit 31$i$ is configured to receive the required output circuit data of a circuit, control turning-on/turning-off of the DC/DC conversion unit 32$i$, and/or adjust an output voltage of the DC/DC conversion unit.

The DC/DC conversion unit 32$i$ is configured to implement conversion from a DC input voltage to a DC output voltage in the circuit to adjust the output voltage.

Herein, the output voltage feedback network control units 31$i$ may control the DC/DC conversion units 32$i$ to perform voltage conversion, and may also control turning-on/turning-off of output ends of the DC/DC conversion units 32$i$.

Figure 4:
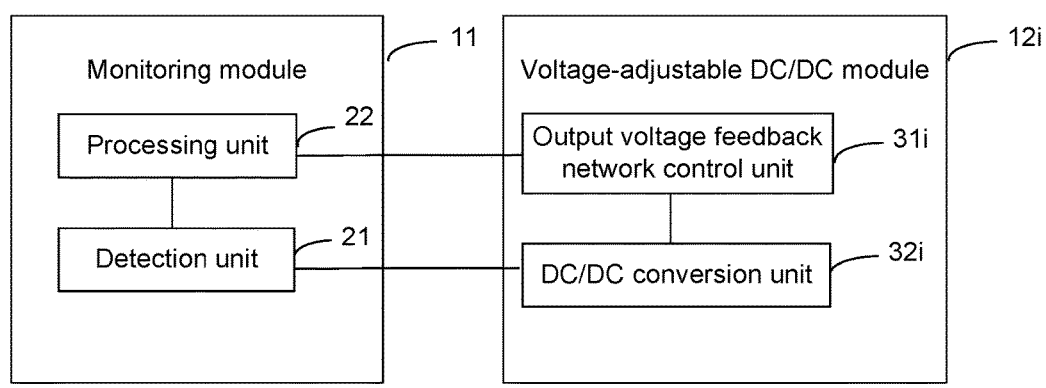
FIG. 4 is a schematic diagram illustrating a connecting relationship between a monitoring module and one of voltage-adjustable DC/DC modules in a power supply control device for a communication network according to the disclosure.

In an embodiment, in the power supply control device for the communication network, the connection between the detection unit 21 and the processing unit 22 in the monitoring module 11 and the output voltage feedback network control unit 31$i$ and the DC/DC conversion unit 32$i$ in one of the voltage-adjustable DC/DC modules 12$i$ is shown in FIG. 4.

According to the power supply control device for the communication network provided by the abovementioned embodiment, dynamic changes of loads of each of the power supply circuits may be tracked in real time, current equalization problems caused by the dynamic changes of the loads may be solved, equalization processing of input currents may be implemented, a voltage compensation range may be effectively widened, conversion efficiency of current equalization may be improved, and system heat loss may be reduced, so that more electric energy may be provided, and adaptability to wider application scenarios may be achieved.

Figure 5:
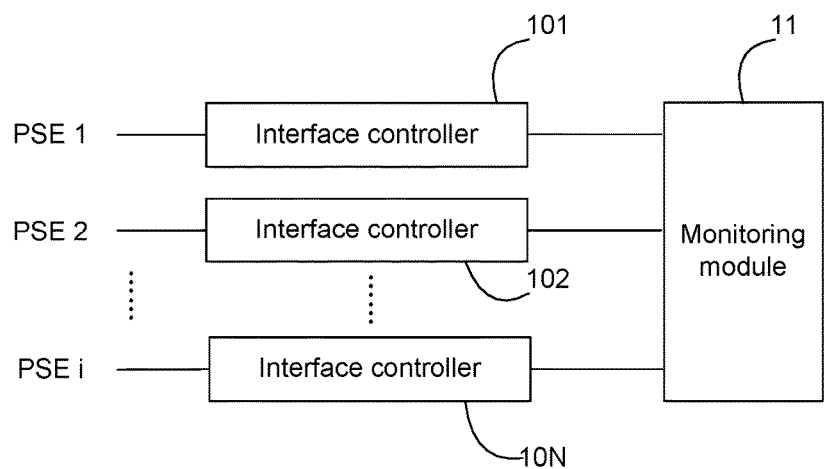
FIG. 5 is a schematic diagram illustrating a connecting relationship between interface controllers and the monitoring module in a power supply control device for a communication network according to the disclosure.

In an embodiment, as shown in FIG. 5, the power supply control device for the communication network may further include: N interface controllers 10$i$ (wherein i=1,2, . . . N, and N is an integer more than or equal to 2), each of the interface controllers 10$i$ is configured to receive a DC current from a piece of PSE, an input end of each of the interface controllers 10$i$ is connected with the PSE, and an output end of each of the interface controllers 10$i$ is connected with an input end of the monitoring module 11.

Figure 6:
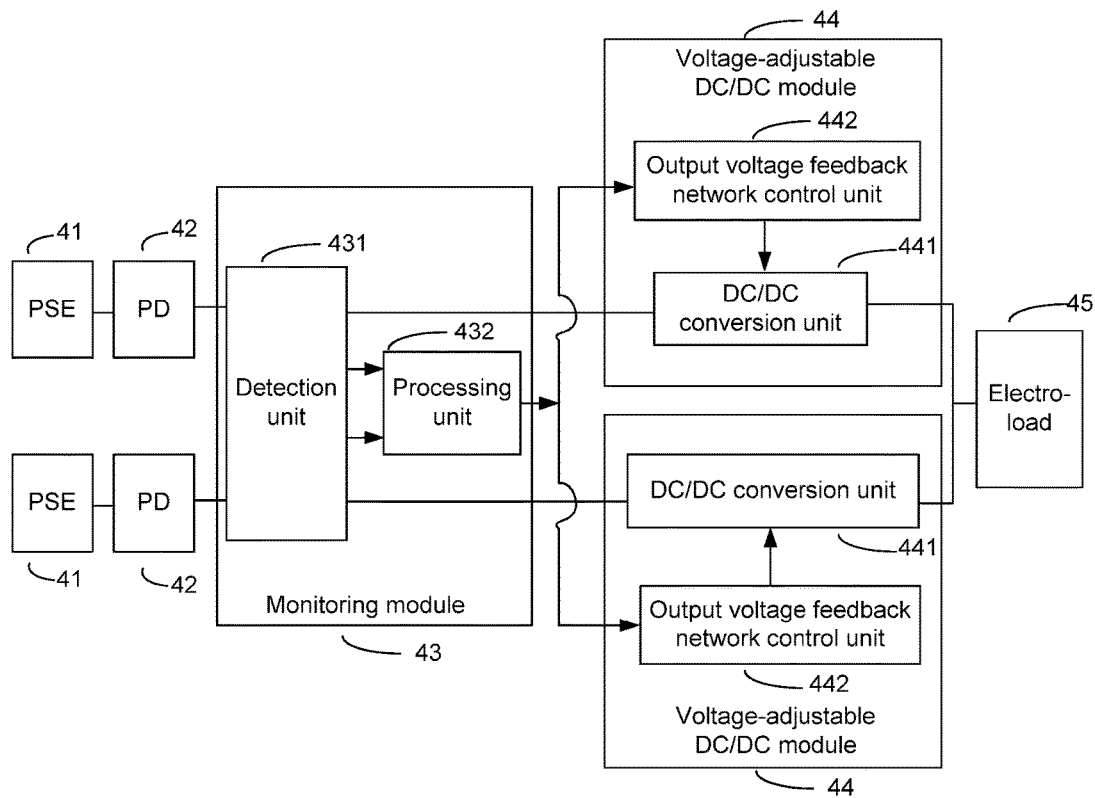
FIG. 6 is a schematic diagram illustrating an organizational structure and connecting relationship of an embodiment of a power supply control device for a communication network in an application scenario according to the disclosure.

FIG. 6 is a structure diagram illustrating an embodiment of a power supply control device for a communication network in an application scenario according to the disclosure. In the application scenario, a communication network which provides electric energy is the Ethernet, two pieces of Ethernet PSE 41 supply power to an electro-load 45, and two interface controllers are required to receive DC currents provided by the PSE. The interface controller is called Powered Device (PD) 42 in power over Ethernet.

As shown in FIG. 6, a monitoring module 43 is arranged behind each of the power supply circuits. A detection unit 431 is connected to output ends of the two PDs 42 and is configured to detect circuit data of each of the power supply circuits. A processing unit 432 of the monitoring module 43 compares the circuit data of the two power supply circuits, calculates an average value, analyses required output voltages of each circuit, and transmits the required output voltages of two circuits respectively to two voltage-adjustable DC/DC modules 44. Output voltage feedback network control unit 442 in the voltage-adjustable DC/DC module 44 receives required output voltage information of the circuit from the processing unit 432, controls turning-on/turning-off of DC/DC conversion unit 441, and/or adjusts output voltage of the DC/DC conversion unit 441. Voltage of output end meets a power supply requirement after adjustment by the DC/DC conversion unit 441. The output ends of the two DC/DC conversion units 441 are connected in parallel to supply power to the subordinate electro-load 45. In FIG. 6, straight lines represent flowing paths of the DC currents, and straight lines with arrowheads represent flowing paths of control information.

According to the power supply control device for the communication network provided by the abovementioned embodiments, dynamic changes of loads of each of the power supply circuits may be tracked in real time, current equalization problems caused by the dynamic changes of the loads may be solved, equalization processing of input currents may be implemented, a voltage compensation range may be effectively widened, conversion efficiency of current equalization may be improved, and system heat loss may be reduced, so that more electric energy may be provided, and adaptability to wider application scenarios may be achieved.

Figure 7:
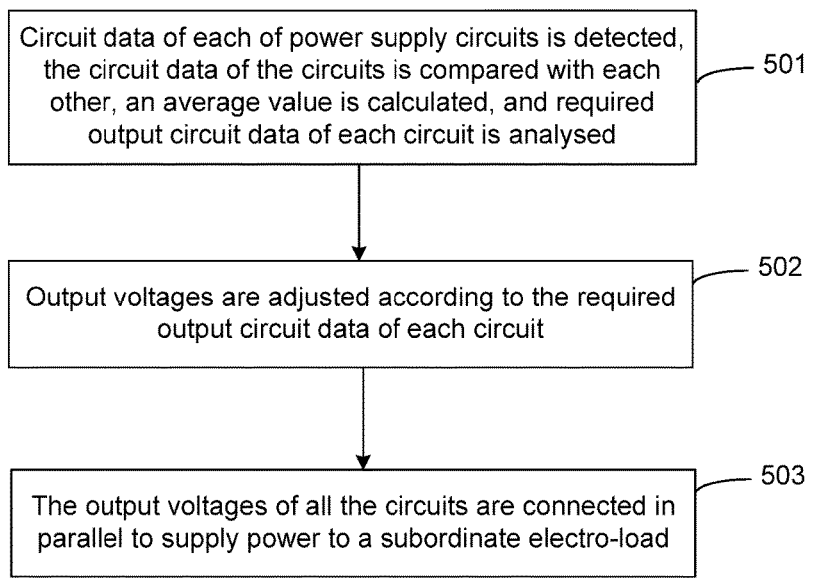
FIG. 7 is a flowchart showing an embodiment of a power supply control method for a communication network according to the disclosure.

FIG. 7 is a flowchart showing an embodiment of a power supply control method for a communication network according to the disclosure. As shown in FIG. 7, the method includes:

Step 501: circuit data of each of the power supply circuits is detected, the circuit data of the circuits is compared with each other, an average value is calculated, and required output circuit data of each circuit is analysed;

Step 502: output voltage is adjusted according to the required output circuit data of each circuit; and Step 503: the output voltages of all the circuits are connected in parallel to supply power to a subordinate electro-load.

Specifically, the monitoring module firstly detects the circuit data of each of the power supply circuits, compares the detected circuit data of the circuits, calculates the average value, analyses required output voltage of each circuit, and sends the required output circuit data of each circuit to respective voltage-adjustable DC/DC module; then, each of the voltage-adjustable DC/DC modules adjusts the output voltage of each circuit according to the required output circuit data of each circuit; and finally, the output voltages of all the circuits are connected in parallel to supply power to the subordinate electro-load.

In an embodiment, after the step that the circuit data of the circuits is compared, the average value is calculated and the required output circuit data of each circuit is analysed, the method further includes that: enabling/disabling of a DC/DC conversion function is controlled.

In an embodiment, before Step 501, the method further includes that: DC currents from N pieces of PSE are received, N being an integer more than or equal to 2.

According to the power supply control method for the communication network provided by the abovementioned embodiments, dynamic changes of loads of each of the power supply circuits may be tracked in real time, current equalization problems caused by the dynamic changes of the loads may be solved, equalization processing of input currents may be implemented, a voltage compensation range may be effectively widened, conversion efficiency of current equalization may be improved, and system heat loss may be reduced, so that more electric energy may be provided, and adaptability to wider application scenarios may be achieved.

Those skilled in the art should know that the embodiments of the disclosure may be provided as a method, a system or a computer program product. Therefore, the disclosure may adopt a form of hardware embodiment, software embodiment and a combination thereof. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, equipment (system) and computer program product according to the embodiments of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

The above is only the preferred embodiments of the disclosure and not intended to limit the scope of protection of the disclosure.

The invention claimed is:

1. A power supply control device for a communication network, comprising: a monitoring module, N voltage-adjustable Direct Current/Direct Current (DC/DC) modules, and N interface controllers, wherein
the monitoring module comprises:
a detection unit configured to detect circuit data of each of N power supply circuits, wherein the circuit data comprises current data and voltage data; and
a processing unit configured to compare the circuit data of the N power supply circuits with each other, calculate an average value of the circuit data, analyze required output circuit data of each of the N power supply circuits, and transmit the required output circuit data of each of the N power supply circuits to respective voltage-adjustable DC/DC module of the N voltage-adjustable DC/DC modules;
the N power supply circuits comprise N pieces of Power Sourcing Equipment (PSE);
each of the N interface controllers is configured to receive a DC current from a piece of the N pieces of PSE;
an input end of each of the N interface controllers is connected with a respective one of the N pieces of PSE, and an output end of each of the N interface controllers is connected with a respective input end of the detection unit;
the N voltage-adjustable DC/DC modules are configured to receive the required output circuit data of the N power supply circuits from the monitoring module, and adjust output voltages of the N power supply circuits according to the required output circuit data, wherein the circuit data remains unchanged during the adjusting;
N output ends of the monitoring module are connected with input ends of the N voltage-adjustable DC/DC modules respectively;
output ends of the N voltage-adjustable DC/DC modules are directly connected in parallel to supply power to a subordinate electro-load, wherein the subordinate electro-load is an electric consuming device at termination of the N power supply circuits for the communication network; and
N is an integer more than or equal to 2.

2. The power supply control device for the communication network according to claim 1, wherein each of the N voltage-adjustable DC/DC modules comprises: an output voltage feedback network control unit and a DC/DC conversion unit, wherein
the output voltage feedback network control unit is configured to perform at least one of receiving the required output circuit data of the N power supply circuits, controlling turning-on/turning-off of the DC/DC conversion unit, or adjusting an output voltage of the DC/DC conversion unit; and
the DC/DC conversion unit is configured to implement conversion from a DC input voltage to a DC output voltage in a power supply circuit of the N power supply circuits to adjust the output voltage of the power supply circuit according to the required output circuit data.

3. A power supply control method for a communication network, comprising:
receiving DC currents from N pieces of Power Sourcing Equipment (PSE), N being an integer more than or equal to 2;
detecting circuit data of each of a plurality of power supply circuits, comparing the circuit data of the power supply circuits with each other, calculating an average value of the circuit data, and analyzing required output circuit data of each of the power supply circuits, wherein the circuit data comprises current data and voltage data, wherein the power supply circuits comprise the N pieces of PSE;
controlling enabling/disabling of a Direct Current/Direct Current (DC/DC) conversion function after comparing the circuit data of the power supply circuits with each other, calculating the average value of the circuit data, and analyzing the required output circuit data of each of the power supply circuits;

adjusting output voltage of each of the power supply circuits according to the required output circuit data of each of the power supply circuits, wherein the circuit data remains unchanged during the adjusting; and connecting the output voltages of all the power supply circuits in parallel to supply power to a subordinate electro-load directly, wherein the subordinate electro-load is an electric consuming device at termination of the power supply circuits for the communication network.

* * * * *